United States Patent
Chuang

(10) Patent No.: US 12,002,196 B2
(45) Date of Patent: Jun. 4, 2024

(54) ELECTRONIC DEVICE AND METHOD FOR MARKING DEFECTS OF PRODUCTS

(71) Applicant: HON HAI PRECISION INDUSTRY CO., LTD., New Taipei (TW)

(72) Inventor: Chih-Yuan Chuang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 384 days.

(21) Appl. No.: 17/395,735

(22) Filed: Aug. 6, 2021

(65) Prior Publication Data
US 2022/0044382 A1    Feb. 10, 2022

(30) Foreign Application Priority Data
Aug. 7, 2020 (CN) .......... 202010791548.8

(51) Int. Cl.
*G06T 7/00* (2017.01)
*B25J 9/16* (2006.01)

(52) U.S. Cl.
CPC ............. *G06T 7/001* (2013.01); *B25J 9/1687* (2013.01); *B25J 9/1697* (2013.01); *G06T 2207/20132* (2013.01); *G06T 2207/30204* (2013.01)

(58) Field of Classification Search
CPC ......... G06T 7/0002; G06T 7/001; G06T 7/73; G06T 7/0004; G06T 7/80; G06T 2207/30204; G06T 2207/20081; G06T 2207/30164; B25J 9/1697; B25J 9/1687; B25J 9/161; B25J 9/163; B25J 9/1612; B65C 9/26; B65C 2009/402; G05B 2219/45066; G05B 2219/45134; G01R 31/2836; G06K 9/626; G06K 9/6256; G06K 9/2018; G01N 21/8851; G01N 2021/889
USPC ............ 356/237.1–237.5, 630–632; 382/141
See application file for complete search history.

(56) References Cited

U.S. PATENT DOCUMENTS

| | | | |
|---|---|---|---|
| 2011/0083790 A1* | 4/2011 | Kimura | B32B 41/00 156/64 |
| 2018/0370027 A1* | 12/2018 | Oota | G06F 18/217 |
| 2019/0012579 A1* | 1/2019 | Namiki | G06V 10/764 |
| 2020/0003828 A1* | 1/2020 | Ambikapathi | G06F 18/24765 |

FOREIGN PATENT DOCUMENTS

| | | | |
|---|---|---|---|
| CN | 210647313 | | 6/2020 |
| JP | 2005053658 A | * | 3/2005 |
| TW | 202016504 | | 5/2020 |

* cited by examiner

*Primary Examiner* — Hoa Q Pham
(74) *Attorney, Agent, or Firm* — ScienBiziP, P.C.

(57) ABSTRACT

A method for marking defects of products implemented in an electronic device is provided. The method includes obtaining at least one detection image of a product to be marked; recognizing a position and a type of at least one defect on the product according to the at least one detection image; transmit the position and the type of the at least one apparent defect to a robot arm; controlling the robot arm to mark the at least one defect on an adhesive film according to the position and the type of the at least one defect; and controlling a film coating unit to apply the adhesive film which is marked to the product.

8 Claims, 5 Drawing Sheets

ELECTRONIC DEVICE AND METHOD FOR MARKING DEFECTS OF PRODUCTS

CROSS-REFERENCE TO RELATED APPLICATIONS

This application claims priority to Chinese Patent Application No. 202010791548.8 filed on Aug. 7, 2020, the contents of which are incorporated by reference herein.

FIELD

The subject matter herein generally relates to product quality control, and particularly to an electronic device and a method for marking defects of products.

BACKGROUND

In manufacturing process, surfaces of products are examined by an automatic optical inspection system (AOI) for surface defects. Non-defective products will continue to subsequent manufacturing processes, while products which are apparently defective and the relevant examination results are transmitted to a recheck station. Operators of the recheck station manually confirm whether an apparent defect is real or misjudged. However, the recheck of the products requires a great deal of manpower, and the process of sorting and transmission to a rechecking process may itself cause new defects on the products.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
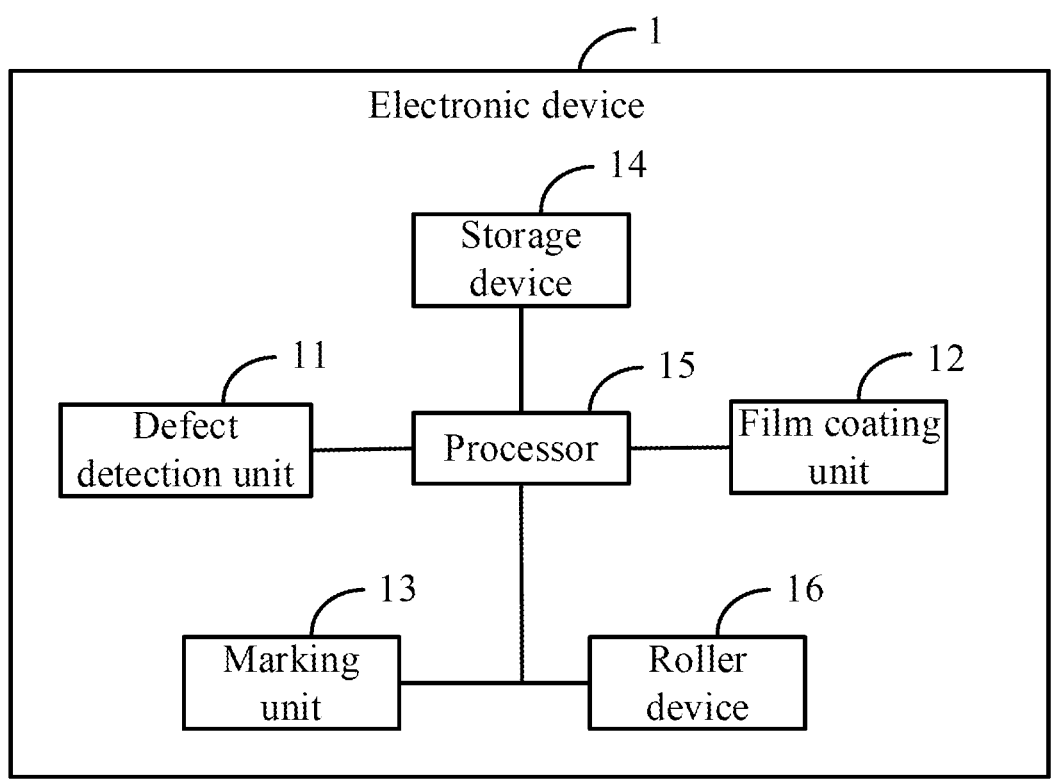
FIG. 1 is a schematic view of an embodiment of an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the presented disclosure.

The presented disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, an electronic device (electronic device 1) is illustrated. The electronic device 1 includes, but is not limited to, a defect detection unit 11, a film coating unit 12, a marking unit 13, a storage device 14, and a processor 15. The defect detection unit 11, the film coating unit 12, the marking unit 13, and the storage device 14 are electrically coupled to the processor 15. Other examples can include more or fewer components than as illustrated or have a different configuration of the various components in other embodiments.

Figure 2:
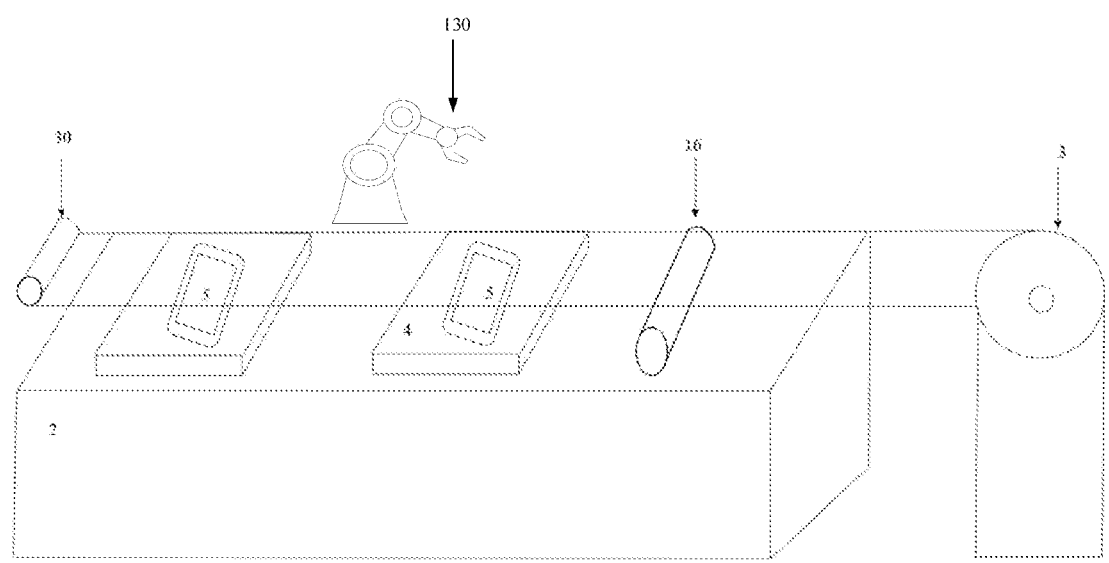
FIG. 2 is a block diagram of an embodiment of an operation of the electronic device in an assembly line according to the present disclosure.

Referring to FIG. 2, in one embodiment, a product 5 (e.g., a mobile phone) is placed on an assembly line 2 for being transferred, a roll of adhesive film 3 is arranged on one end of the assembly line 2, and a traction device 30 is arranged on the other end of the assembly line 2, the traction device 30 can pull the adhesive film 3 while the product 5 is being transferred. The adhesive film 3 pulled by the traction device 30 is located to be parallel with the assembly line 2 and above the product 5 thereon. When the product 5 is transferred by the assembly line 2 to a marking platform 4, the marking unit 13 marks positions and types of any defects which appear to be on the product 5. The defect can be apparent defect. The marking by the marking unit 13 is made up on the adhesive film 3, according to the received positions and types of the defects detected by the defect detection unit 11, and the detected defects on the product 5 is thus clearly marked. The marked adhesive film 3 and the product 5 are transferred to the film coating unit 12. The film coating unit 12 applies the marked adhesive film 3 as a coating on the product 5, and the product 5 is transferred to a recheck station.

In one embodiment, the electronic device 1 further includes a roller device 16, the roller device 16 is located between the adhesive film 3 and the marking platform 4, and is used for calculating a length of the adhesive film 3 required for coating the product 5. In detail, the length of the adhesive film 3 required for the product 5 is calculated by multiplying a circumference of the roller of the roller device 16 and the number of turns rolled by the roller.

When the marking unit 13 completes a marking on the adhesive film 3 and starts to transfers the product 5 to the film coating unit 12, the processor 15 controls the roller device 16 to start rolling, and to stop rolling after the product 5 is transferred to the film coating unit 12. The processor 15 further records the number of turns rolled by the roller device 16 during this process, and calculates the length of the adhesive film 3 required for coating the product 5 according to the number of turns rolled by the roller device 16.

In one embodiment, the defect detection unit 11 can be an automatic optical detection (AOI) device. The defect detection unit 11 can recognize the positions and types of the defects on the product 5, and transmit data as to the positions and types of the defects to the marking unit 13.

In one embodiment, the defect detection unit 11 obtains parameters of the images of the product 5, compares the parameters of the images of the product 5 with the parameters of at least one pre-stored reference image, detects differences between the parameters of the at least one detection image and the at least one reference image, and determines at least one position in the obtained image where a difference exists and also exceeds a preset range, so as to obtain the position of at least one defect on the product 5.

In one embodiment, the parameter may be at least one of a gradation difference, an aspect ratio, a gradation variance, a gradation mean difference, a contrast ratio, a small gradient advantage, a large gradient advantage, non-uniformity of gradation distribution, non-uniformity of gradient distribution, energy, gradation average, gradient average, a gradation mean variance, gradient mean variance, correlation, gradation entropy, gradient entropy, hybrid entropy, a differential matrix, an inverse differential matrix etc.

The defect detection unit 11 captures at least one image of the product 5 through a camera. The camera can be a line array camera, the product 5 can be a mobile phone or a tablet computer. In other embodiments, the defect detection unit 11 can also receive at least one image of the product 5 transmitted by a server. In other embodiments, the defect detection unit 11 can also obtain at least one image of the product 5 from a local database. In one embodiment, the image can include a complete or part image of the product 5, and the image can be in any resolution, or can be high sampled or low sampled, depending on actual requirements.

In other embodiments, the defect detection unit 11 can detect an image of the product 5 through a preset defect recognition model, to determine the type of the defect. The preset defect recognition model may be trained by a neural network training algorithm, for example, a convolutional neural network model is trained by a back propagation algorithm. The neural network training algorithm which is used to train the convolutional neural network model is a prior art and will not be described here.

In detail, the defect detection unit 11 crops the image (e.g., 2K*1K pixels) of the product 5 into a number of blocks (e.g., 224*224 pixels), and inputs each of the number of blocks to the preset defect recognition model according to the position of each of the number of blocks in the image, so as to obtain the defect type of each block, and determines the defect type of the product 5 according to the defect type of each block.

In one embodiment, the defect type varies depending on the category of the product 5 and customer requirements. For example, the product 5 can be a casing of a personal computer, the defect types of the casing include lack of painting, powder dot, scratch, dent, impurity, paint removal, wear, etc.

The marking unit 13 marks the defects on the adhesive film 3 by a robot arm 130 according to the positions and types of the defects. In detail, the marking unit 13 marks the corresponding positions on the adhesive film 3 according to the positions and types of the defects. In one embodiment, the robot arm 130 marks the adhesive film 3 with an oily pen or paint, and represents different defect types in different colors. For example, red represents the wear, blue represents the scratch, and green represents the paint removal.

In one embodiment, the robotic arm 130 marks on the adhesive film 3 with an oily pen or pain, and represents different defect types in different shapes. For example, a circle represents the wear, a square represents the scratch, and a triangle represents the paint removal.

In one embodiment, the robot arm 130 marks the positions on the adhesive film 3 by punching, and represents different defect types in different punched shapes. It can be understood that, the robot arm 130 communicates with the electronic device 1, and the electronic device 1 can transmit control information to control the robot arm 130 to mark the positions on the adhesive film 3 according to the positions and types of the defects.

In one embodiment, the film coating unit 12 can be a laminating machine. The film coating unit 12 applies the marked adhesive film 3 to the product, and transfers the product to the recheck station for recheck or maintenance, and the operators in the recheck station rechecks or maintains the product 5 by examining the marking position on the product 5.

In one embodiment, after the adhesive film corresponding to the defect position of the product 5 is marked, the product 5 is protected by the adhesive film 3 from generating new defects. Furthermore, the operators in the recheck station does not need to view the image or other information to find out the defect position, just directly look at the adhesive film 3.

The processor 15 can be a central processing unit (CPU), a microprocessor, or other data processor chip that performs functions in the electronic device 1.

In one embodiment, the storage device 14 can include various types of non-transitory computer-readable storage mediums. For example, the storage device 14 can be an internal storage system, such as a flash memory, a random access memory (RAM) for the temporary storage of information, and/or a read-only memory (ROM) for permanent storage of information. The storage device 14 can also be an external storage system, such as a hard disk, a storage card, or a data storage medium.

Figure 3:
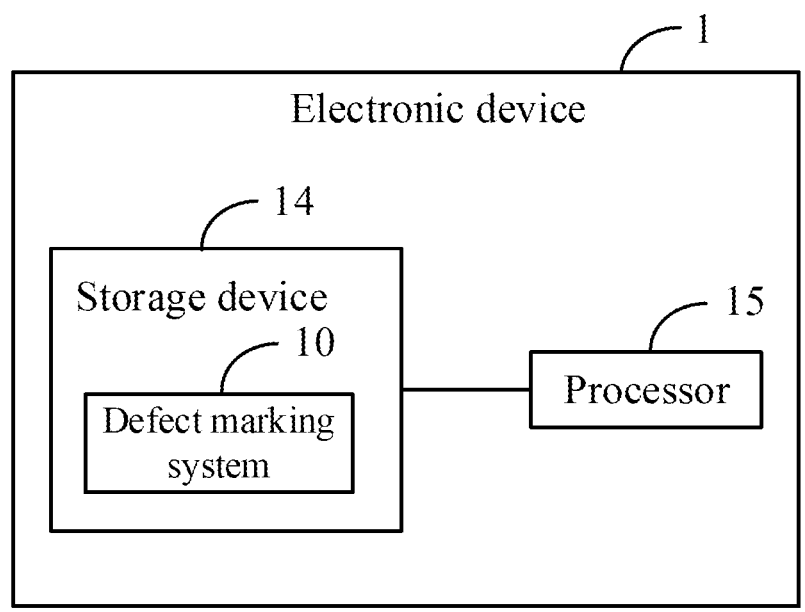
FIG. 3 is a schematic view of an embodiment of a defect marking system in the electronic device according to the present disclosure.
Figure 4:
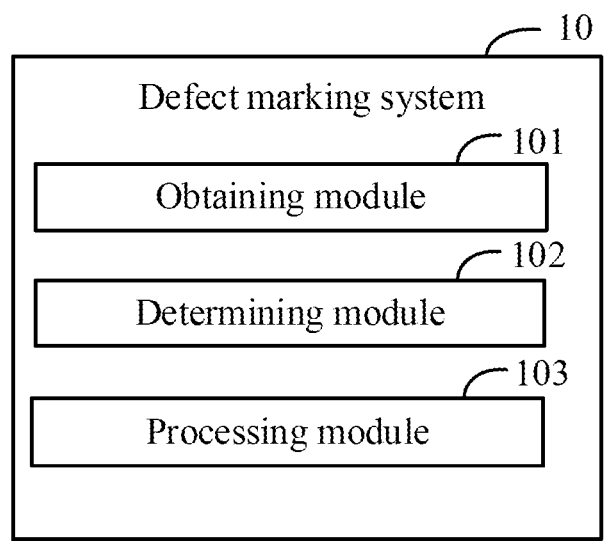
FIG. 4 is a block diagram of an embodiment of a defect marking system in the electronic device according to the present disclosure.

As illustrated in FIG. 3, the electronic device 1 runs a defect marking system 10. The defect marking system 10 at least includes an obtaining module 101, a determining module 102, and a processing module 103 The modules 101-103 can be collections of software instructions stored in the storage device 14 of the electronic device 1 and executed by the processor 15. The modules 101-103 also can include functionality represented by hardware or integrated circuits, or by software and hardware combinations, such as a special-purpose processor or a general-purpose processor with special-purpose firmware.

Figure 5:
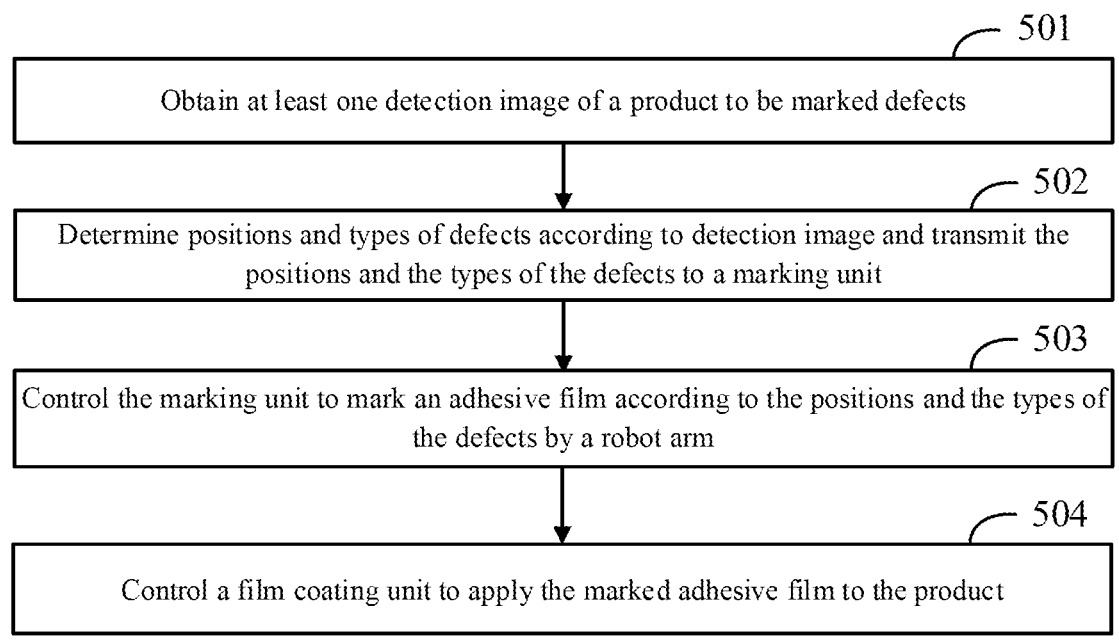
FIG. 5 illustrates a flowchart of an embodiment of a method for marking defects of products according to the present disclosure.

FIG. 5 illustrates a flowchart of a method for marking defects of products. The method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure.

In one embodiment, the method can be applied to the electronic device 1. For the electronic device 1 that requires to mark defects of products, the electronic device 1 can be directly integrated with a function of marking defects of products provided by the method of the present disclosure. The function of marking defects of products may also run on the electronic device 1 in a form of a software development kit (SDK). The example method can begin at block 501.

At 501, the obtaining module 101 obtains an image of a product to be marked (hereinafter detection image).

The product to be marked is a product that requires to be marked defects. For example, the product can be a mobile phone case, a mobile phone protective cover, or any other suitable products.

In one embodiment, the obtaining module 101 may use a camera (not shown in the figure) to capture the product to be marked, thereby obtaining at least one detection image of the product to be marked. The detection image of the product to be marked may also be pre-stored in the storage device 14, and the obtaining module 101 may directly obtain the detection image of the product from the storage device 14.

At block 502, the determining module 102 determines the positions and types of the defects according to the detection image, and transmits the positions and types of the defects to the marking unit.

In one embodiment, the determining module 102 compares the parameters of the images of the product 5 with the pre-stored parameters of a reference image, finds out differences between the parameters of the obtained image and the reference image, and determines at least on position where a difference exists and also exceeds a preset range, so as to obtain the position of at least one defect on the product 5.

The determining module 102 can take a lower left corner of the detection image as an origin O, an lower edge of the detection image as an X axis, and an left edge of the detection image as a Y axis, to establish a coordinate system XOY. The location of the at least one position where the difference exists and exceeds the preset range in the detection image is a coordinate range in the coordinate system XOY. In other embodiment, the coordinate system XOY can also be established in other ways, for example, a lower right corner of the detection image is determined to be the origin O, a lower edge of the detection image is determined to be the X axis, and a right edge of the detection image is determined to be the Y axis.

In one embodiment, the determining module 102 can detect a image of the product 5 through a preset defect recognition model, to determine the type of the defect. The preset defect recognition model can be trained by a neural network training algorithm, for example, a convolutional neural network model is trained by a back propagation algorithm.

In detail, the defect detection unit 11 crops the image ((e.g., 2K*1K pixels) of the product 5 into a number of blocks (e.g., 224*224 pixels), and inputs each block to the preset defect recognition model according to the position of each block in the image, so as to obtain the defect type of each block, and determines the defect type of the product 5 according to the defect type of each block.

At block 503, the processing module 103 controls the marking unit to mark the adhesive film according to the positions and types of the defects by the robot arm.

In one embodiment, the marking unit 13 marks the corresponding positions on the adhesive film 3 according to the positions and types of the defects. In one embodiment, the robot arm 130 marks the adhesive film 3 with an oily pen or pain, and represents different defect types in different colors. For example, red represents the wear, blue represents the scratch, and green represents the paint removal In one embodiment, the robotic arm 130 marks on the adhesive film 3 with an oily pen or paint, and represents different defect types in different shapes. For example, a circle represents the wear, a square represents the scratch, and a triangle represents the paint removal.

In one embodiment, the robot arm 130 marks on the adhesive film 3 by punching, and represents different defect types in different punched shapes. It can be understood that, the robot arm 130 communicates with the electronic device 1, and the electronic device 1 can transmit control information to control the robot arm 130 to mark the positions on the adhesive film 3 according to the positions and types of the defects.

At block 504, the processing module 103 further controls the film coating unit 12 to apply the marked adhesive film 3 to the product.

The film coating unit 12 applies the marked adhesive film 3 to the product, and transfers the product to a recheck station for recheck or maintenance, and the operators in the recheck station rechecks the product 5 by examining the marking position on the product 5

In one embodiment, after the adhesive film corresponding to the defect position of the product 5 is marked, the product 5 is protected by the adhesive film 3 from generating new defects. Furthermore, the operators in the recheck station does not need to view the image or other information to find out the defect position, just look at the adhesive film 3.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:
1. An electronic device comprising:
   at least one processor;
   an AOI (Automatic Optical Inspection) system coupled to the at least one processor;
   a robot arm coupled to the at least one processor;
   a film coating unit coupled to the at least one processor; and
   a storage device coupled to the at least one processor and storing instructions for execution by the at least one processor to cause the at least one processor to:
   control the AOI system to recognize a position and a type of at least one defect on a product;
   obtain parameters of at least one detection image of the product;
   compare the parameters of the at least one detection image of the product with parameters of a pre-stored reference image;
   detect differences between the parameters of the at least one detection image and the reference image;
   determine at least one position where a difference exists and exceeds a preset range, so as to obtain the position of the at least one defect on the product;
   transmit the position and the type of the at least one defect to the robot arm;

control the robot arm to mark the at least one defect on an adhesive film according to the position and the type of the at least one defect; and control the film coating unit to apply the marked adhesive film to the product.

2. The electronic device according to claim 1, further comprising:

a roller coupled to the at least one processor and configured to calculate a length of the adhesive film required for coating the product.

3. The electronic device according to claim 2, wherein the at least one processor is further caused to:

control, in response that the robot arm completes marking the at least one defect on the adhesive film and starts to transfer the product to the film coating unit, the roller to start rolling;

control the roller to stop rolling after the product is transferred to the film coating unit;

record the number of turns rolled by the roller; and calculate the length of the adhesive film required for coating the product by multiplying a circumference of the roller and the recorded number of turns.

4. The electronic device according to claim 1, wherein in response that the product is placed on an assembly line for being transferred, the adhesive film is arranged on one end of the assembly line, and a traction device is arranged on the other end of the assembly line, the traction device pulls the adhesive film to transfer together with the product, the adhesive film pulled by the traction device is located to be in parallel with the assembly line and above the product.

5. The electronic device according to claim 4, wherein the at least one processor is further caused to:

crop at least one detection image of the product into a plurality of blocks;

input each of the plurality of blocks to a preset defect recognition model according to the position of each of the plurality of blocks in the at least one detection image;

obtain a defect type of each of the plurality of blocks; and determine the type of the at least one defect of the product according to the defect type of each of the plurality of blocks.

6. A method for marking defects of products implemented in an electronic device comprising:

obtaining at least one detection image of a product to be marked;

recognizing a position and a type of at least one defect on the product according to the at least one detection image;

obtaining parameters of at least one detection image of the product;

comparing the parameters of the at least one detection image of the product with parameters of a pre-stored reference image;

detecting differences between the parameters of the at least one detection image and the reference image;

determining at least one position where a difference exists and exceeds a preset range, so as to obtain the position of the at least one defect on the product;

transmitting the position and the type of the at least one defect to a robot arm;

controlling the robot arm to mark the at least one defect on an adhesive film according to the position and the type of the at least one defect; and controlling a film coating unit to apply the marked adhesive film to the product.

7. The method according to claim 6, the method of recognizing a type of at least one defect on the product by a preset defect recognition model detecting the at least one detection image comprises:

cropping at least one detection image of the product into a plurality of blocks;

inputting each of the plurality of blocks to the preset defect recognition model according to the position of each of the plurality of blocks in the at least one detection image;

obtaining a defect type of each of the plurality of blocks; and determining the type of the at least one defect of the product according to the defect type of each of the plurality of blocks.

8. The method according to claim 6, further comprising:

controlling, in response that the robot arm completes marking the at least one defect on the adhesive film and starts to transfer the product to the film coating unit, a roller to start rolling;

controlling the roller to stop rolling after the product is transferred to the film coating unit;

recording the number of turns rolled by the roller; and calculating the length of the adhesive film required for coating the product by multiplying a circumference of the roller and the recorded number of turns.

* * * * *